United States Patent
Dykman et al.

(10) Patent No.: US 6,749,255 B2
(45) Date of Patent: Jun. 15, 2004

(54) BLOW MOLDED MULTIPLE FUNCTION ASSEMBLIES FOR VEHICLE HEADLINERS

(75) Inventors: Mike Dykman, Lake Orion, MI (US); Jim Mestemaker, Lambertville, MI (US); David M. Fox, Wixom, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/177,645

(22) Filed: Jun. 21, 2002

(65) Prior Publication Data
US 2003/0234559 A1 Dec. 25, 2003

(51) Int. Cl.[7] .................................................. B60J 7/00
(52) U.S. Cl. ........................ 296/214; 454/138; 454/137
(58) Field of Search ................................ 296/214, 208, 296/190.09, 37.8; 454/138, 137, 136; 428/318.4; 381/86; 280/730.1

(56) References Cited

U.S. PATENT DOCUMENTS

| | | | | |
|---|---|---|---|---|
| 1,778,546 A | * | 10/1930 | Bode | 454/138 |
| 1,804,264 A | * | 5/1931 | McDevitt | 454/137 |
| 1,935,456 A | * | 11/1933 | McCarty | 454/138 |
| 2,171,622 A | * | 9/1939 | Calkins | 454/138 |
| 2,257,639 A | * | 9/1941 | Moore | 454/138 |
| 3,059,561 A | * | 10/1962 | Wilfert | 454/137 |
| 3,597,799 A | | 8/1971 | Earle | |
| 3,656,423 A | * | 4/1972 | Anthony | 454/136 |
| 3,868,896 A | * | 3/1975 | Doll et al. | 454/137 |
| 4,252,053 A | * | 2/1981 | Muto et al. | |
| 4,640,184 A | * | 2/1987 | Matsushima et al. | 454/137 |
| 4,721,031 A | * | 1/1988 | Nakata et al. | 454/137 |
| 5,054,378 A | * | 10/1991 | Speece | 454/137 |
| 5,120,271 A | * | 6/1992 | Shtanko | 454/137 |
| 5,383,815 A | * | 1/1995 | Kiesel et al. | 296/214 |
| 5,399,121 A | * | 3/1995 | Gray et al. | 454/137 |
| 5,501,634 A | * | 3/1996 | Wilder | 454/136 |
| 5,531,641 A | * | 7/1996 | Aldrich | 454/137 |
| 5,706,170 A | * | 1/1998 | Glovatsky et al. | |
| 5,913,566 A | * | 6/1999 | Stauffer et al. | |
| 5,921,619 A | * | 7/1999 | Cederberg et al. | 296/190.09 |
| 5,952,089 A | * | 9/1999 | Namura et al. | 428/318.4 |
| 6,004,202 A | * | 12/1999 | McCorkel et al. | 454/137 |
| 6,062,635 A | * | 5/2000 | Learman et al. | 296/214 |
| 6,070,902 A | * | 6/2000 | Kowalski et al. | 296/214 |
| 6,086,145 A | * | 7/2000 | Wandyez | |
| 6,095,595 A | * | 8/2000 | Galbraith | |
| 6,120,090 A | * | 9/2000 | Van Ert et al. | 296/214 |
| 6,120,091 A | * | 9/2000 | Reich et al. | 296/214 |
| 6,120,370 A | * | 9/2000 | Asou et al. | 454/137 |
| 6,315,354 B1 | * | 11/2001 | Tani et al. | 296/214 |
| 6,322,136 B2 | * | 11/2001 | Boyce et al. | 296/214 |
| 6,338,517 B1 | * | 1/2002 | Canni et al. | 296/37.8 |
| 6,508,076 B1 | * | 1/2003 | Gast et al. | 454/137 |
| 6,508,702 B1 | * | 1/2003 | Fabiano et al. | 454/138 |
| 6,517,147 B2 | * | 2/2003 | Grimm | 296/214 |
| 2001/0012369 A1 | * | 8/2001 | Marquiss | 381/86 |
| 2002/0145298 A1 | * | 10/2002 | Williams et al. | |
| 2002/0190506 A1 | * | 12/2002 | Tiesler | 280/730.1 |
| 2002/0195844 A1 | * | 12/2002 | Hipwell | |

FOREIGN PATENT DOCUMENTS

| | | |
|---|---|---|
| GB | 2 018 978 A | 10/1979 |
| JP | 2002029353 | 1/2002 |
| WO | WO 00/03899 | 1/2000 |

\* cited by examiner

*Primary Examiner*—Kiran Patel
(74) *Attorney, Agent, or Firm*—Bill C. Panagos

(57) ABSTRACT

A seamless plastic tubular air duct is formed by a blow molding process. The air duct is attached to upper surface of a vehicle headliner and controls the flow of air between the vehicle air circulation system and vents to the passenger compartment. Attachment points may be formed upon the outer surface of the air duct for securing other vehicle components to the headliner.

12 Claims, 4 Drawing Sheets

BLOW MOLDED MULTIPLE FUNCTION ASSEMBLIES FOR VEHICLE HEADLINERS

BACKGROUND OF THE INVENTION

This invention relates in general to vehicle headliners and in particular to a blow formed air duct and other blow formed components that are attached to a vehicle headliner.

In modern vehicles, headliners are typically placed against the inside surface of the top of the passenger compartment to provide a covering. More recently, and in particular in larger vehicles such as minivans, air flow vents are mounted through the headliner to deliver air into the passenger compartment. Typically, air flow ducts have been provided between the ceiling of the vehicle and the headliner to direct air flow from the vehicle air flow circulation system through to vents formed through the headliner of the vehicle.

Referring now to the drawings, there is illustrated in FIG. 1 a known headliner assembly 20 that includes a headliner body 22 with a non-exposed, upper face 23 and an exposed, lower face 25 having vent openings 24 and 26 spaced along one lateral side. Similar openings, which are not shown, also are spaced along the opposite lateral side of the headliner body 22. An air supply opening 28 communicates with an air supply vent in the frame of the vehicle. A U-shaped plastic air duct 30 is positioned on the upper headliner face 23 and along a side of the headliner body 22 to define the air flow passages. An enlarged vent portion 32 is positioned over the vent opening 24 and an enlarged vent portion 34 covers vent opening 26. Another vent side portion 36 is positioned along the opposite side of the headliner body 22. A rear connection portion 38 connects the two side portions 32 and 36 to provide the generally U-shaped duct 30. Vents 40 are placed within the openings 24 and 26 to complete the assembly 20.

The air duct 30 is typically formed from a plastic by injection or vacuum molding. The air duct 30 is secured to the headliner body 22 by adhesive or welding techniques, such as vibration, sonic or dielectric wielding.

As shown in FIG. 2, the air duct 30 is open at its lower face and the upper face 23 of the headliner body 22 closes off an airflow passage 42 in combination with the duct 30. In this way, air can pass from opening 28 such as from a supply duct 44 formed in the frame of the vehicle body and into the airflow passage 42. From airflow passage 42, air flows to the vent openings 24 and 26 on both lateral sides of the vehicle. Further details of the air duct 30 are included in U.S. Pat. No. 6,062,635, which issued on May 16, 2000, and is incorporated herein by reference.

The air duct 30 described above requires a continuous seal between the edges of duct portions 32, 36 and 38 and the surface 23 of the headliner body 22 to form the airflow passage 42. If the seal is intermediate, air will leak from the duct 30 and into the space between headliner body 22 and the roof of the passenger compartment. Such leaks would decrease the air flow through the vents and thereby reduce the efficiency of the vehicle heating and air conditioning system. Additionally, the increased air pressure between the headliner body 22 and the roof of the vehicle may separate the headliner from the vehicle roof. Accordingly, it would be desirable to provide an improved air duct.

SUMMARY OF THE INVENTION

This invention relates to blow formed air duct and other blow formed components that are attached to a vehicle headliner.

The present invention contemplates a vehicle headliner assembly that includes a formed headliner body having at least one aperture formed threthrough. A seamless tubular air duct is attached to the headliner body. The air duct has at least one aperture formed therethrough that is aligned with the aperture formed through the headliner body. The seamless duct is formed by a blow molding process and can include a plurality of seamless tubular portions that are joined together to form the complete duct. The air duct also can be formed to include attachment points for other components, such as, for example, hand grab assist handles and wiring harness attachment devices. Thus, the blow molded components can provide multiple functions.

The invention also contemplates a process for forming a vehicle headliner assembly that includes providing a hollow tubular blank formed from plastic, the blank having a closed end and an open end opposite from the closed end. The blank is heated until it becomes. The heated blank is placed into a hollow mold and a pressurized gas is supplied into the open end of the blank to expand the blank to conform to the shape of the mold cavity to form a component for a headliner assembly. The headliner component is allowed to cool and then removed from the mold. Finally, the headliner component is attached to a headliner body.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 3:
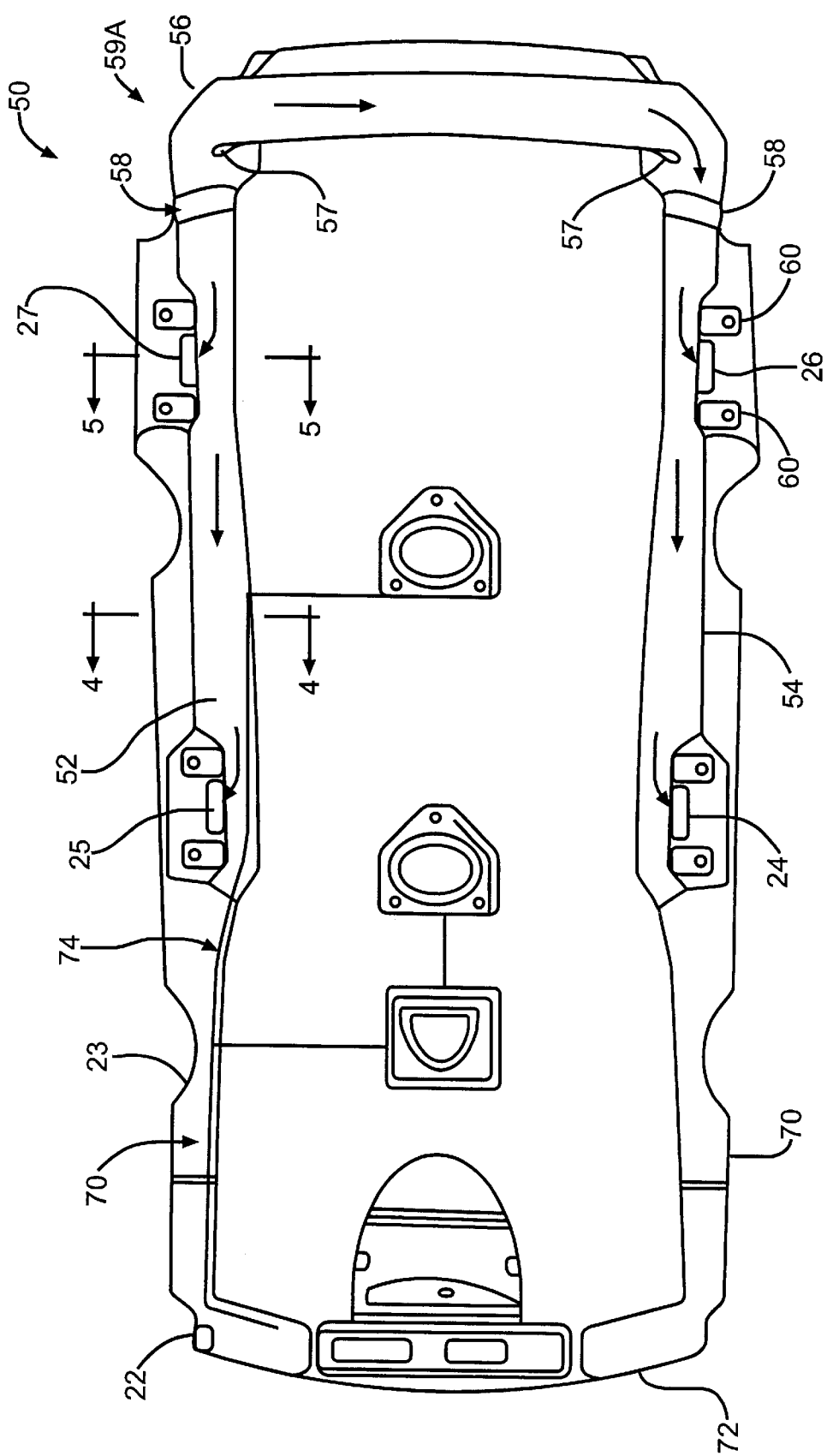
FIG. 3 is a plan view of a headliner assembly that includes blow formed air duct and other components in accordance with the invention.

Referring again to the drawings, there is illustrated in FIG. 3 an improved headliner assembly 50 in accordance with the invention. Components which are similar to components shown in previous drawings have the same numerical identifiers. The headliner assembly includes a headliner body 22. FIG. 3 shows the non-exposed upper surface 23 of a headliner body for a van. It will be appreciated that the headliner also could be for a truck or other vehicle. The left end of the headliner body 22 corresponds to the front of the vehicle passenger compartment. The present invention contemplates an improved air duct 52 that is assembled from portions formed by blow molding. Blow molding is a recently developed process in which a generally tubular shaped hollow piece of plastic is used as a blank. The plastic blank heated until it is softened to be elastic or ductile, but not to the point that it collapses. The heated plastic blank is then inserted into a mold cavity. Usually a multi-piece mold is used and the mold elements are closed over the blank. The multi-piece mold enhances formation of complex shapes while allowing removal of the component from the mold.

A pressurized gas, such as compressed air, is then fed into the blank. The pressurized gas forces the plastic outward and into conformance with the shape of the mold cavity. The pressure is maintained while the plastic cools to assure that the shape of the mold cavity is retained by the plastic. After cooling, the mold is opened and the plastic component is removed. The result is a seamless, generally tubular shaped hollow component. Apertures for allowing air flow into and out of the component may then be easily formed therethrough by cutting, punching, drilling or any other conventional process.

In the preferred embodiment, High Density PolyEthylene (HDPE) or Polypropylene plastic is used to form the duct portions; however, other types of plastic also may be utilized. The thickness of the blank is controlled to allow for stretching of the blank as it is expanded into the mold cavity by the pressurized gas. The particular shape of the duct for any specific headliner application may vary; however, the use of blow molding controls the exterior and thereby the interior shape of the duct to provide superior airflow control. The resulting ducts can have a thin wall thickness to reduce the weight of the duct.

The present invention contemplates forming side duct portions 52 and 54 and the cross duct portion 56 by blow molding. It is further contemplated that the forward ends of the blanks used to form the side duct portions are closed. Accordingly, seamless tubular vent portions are formed that have closed surfaces, as best seen in the sectional views shown in FIGS. 4 and 5. As shown in FIG. 3, internal vanes 57 may be integrally formed within the air duct portions for directing air flow through the duct. The side and cross air duct portions 52, 54 and 56 are joined by air tight joints 58. In the preferred embodiment, the portions are joined by sonic welding; however, other conventional processes also can be used, such as, for example, vibration or dielectric welding or an adhesive can be used. The completed duct assembly is attached to the upper face 23 of the headliner body 22 by a conventional method such as sonic, vibration or dielectric welding or with adhesive bonding.

Figure 5:
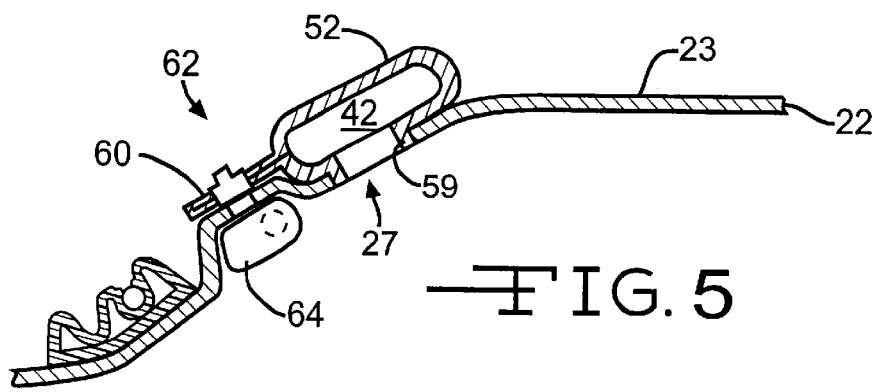
FIG. 5 is a sectional view of a portion of the headliner assembly shown in FIG. 3 that is taken along line 5—5.

Because the duct is formed having a generally tubular cross sectional shape, there are no seams that would allow air leakage from the duct 50. Thus, it is not necessary to form a continuous seam along the edges of the duct as described above for the prior art headliner assembly 20. Apertures formed through the duct portions are aligned with corresponding apertures formed through the headliner body 22 to allow air to flow into and out of the duct. As best seen in FIG. 5, a protruding lip 59 can also be formed about the edges of the duct aperture during the blow molding process. The lip extends through the corresponding aperture in the headliner body 22 to better direct the flow of air while also aligning the duct upon the headliner body. The arrows in FIGS. 3 and 5 illustrate the direction of the airflow through the air duct 50. As shown in FIG. 3, air enters the air duct through an inlet aperture 59A formed through the cross duct portion 56 in the upper right corner of the drawing. The inlet aperture would be aligned with an air supply duct (not shown) formed in the body of the vehicle. The air divides and flows along both side portions 52 and 54 of the duct before exiting into the passenger compartment through air outlet vents labeled 24, 25, 26 and 27. The inventors have found that it is possible to form larger air duct portions with blow forming methods than with the prior art molding methods. This reduces the number of molding tools and presses needed to fabricate air ducts while also reducing the need for certain post-mold assembly operations.

Additionally, hollow spaces can be provided in the mold cavity for forming tabs 60 that extend from the air duct portions. Apertures 62 are formed through the tabs 60 to provide retainers or attachment points for other components, such as, for example, hand grab assist handles 64. Thus, the blow molded component can provide multiple functions. As illustrated in FIG. 5, the side air duct 52 provides both a seamless air channel 42 and attachment points 60 for assist handles.

Figure 1:
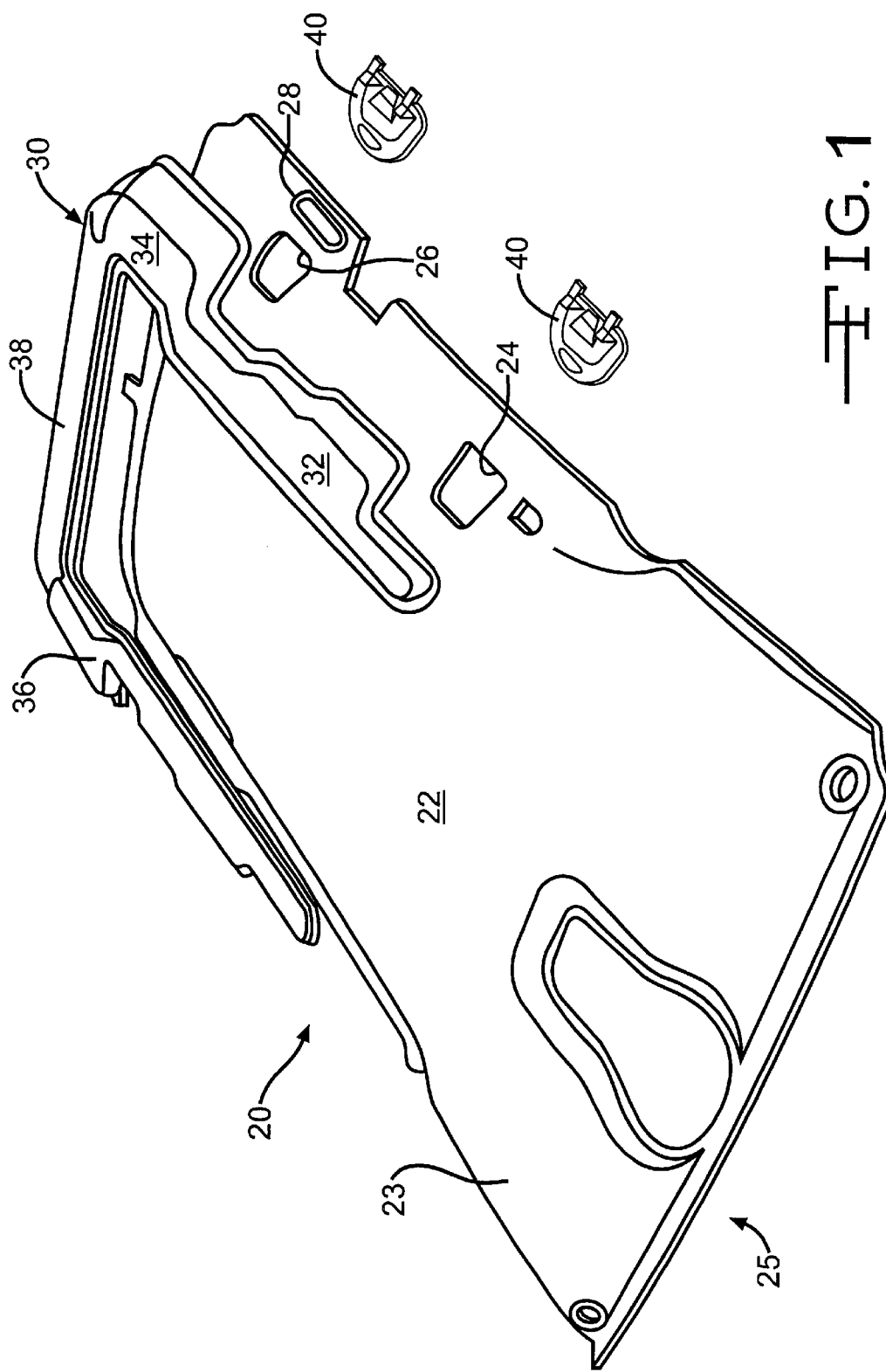
FIG. 1 is an exploded perspective drawing of a vehicle headliner assembly in accordance with the prior art.
Figure 2:
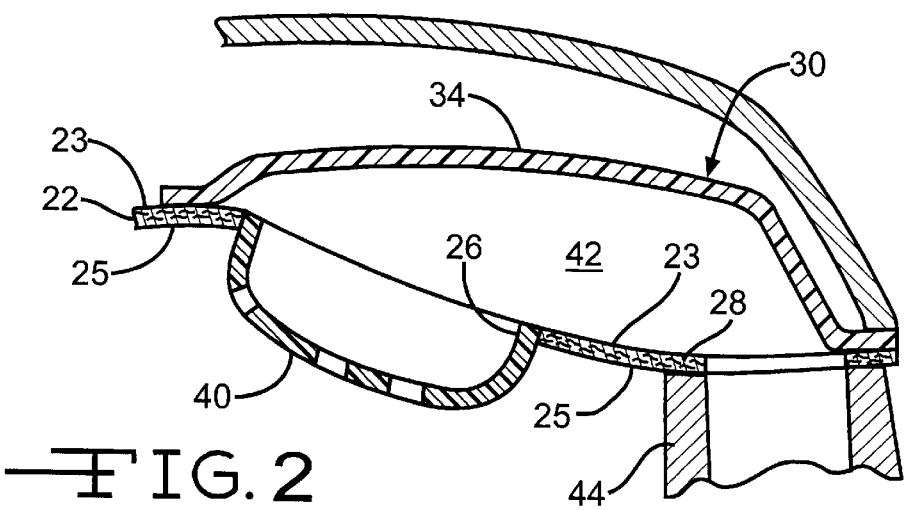
FIG. 2 is a sectional view of a portion of the headliner assembly shown in FIG. 1.
Figure 4:
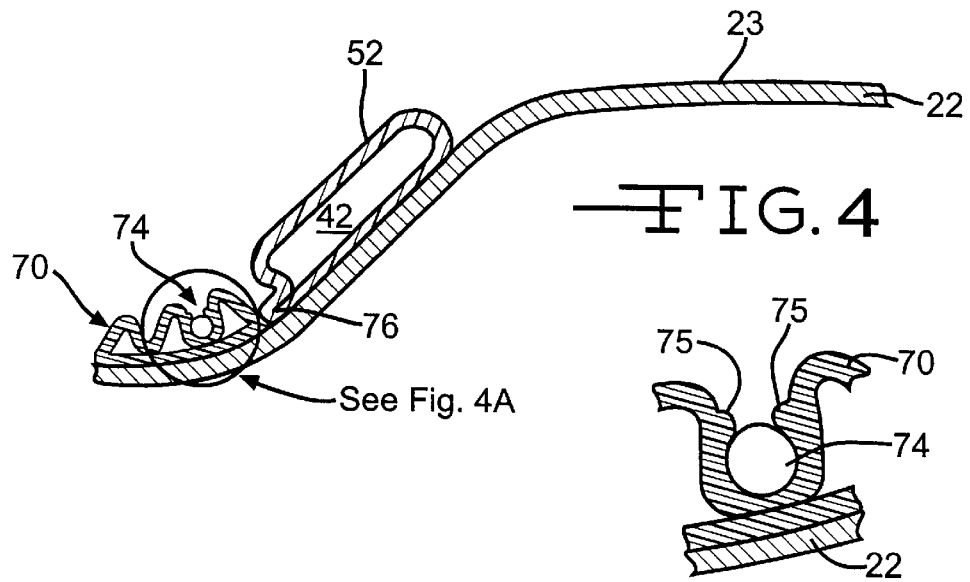
FIG. 4 is a sectional view of a portion of the headliner assembly shown in FIG. 3 that is taken along line 4—4.

The invention further contemplates using blow molding to form other hollow components that are subsequently attached to the head liner body 22. For example, energy management devices 70 also can be formed from hollow plastic blanks by air blowing. As best seen in FIGS. 4 and 5, the devices consist of a plurality of parallel hollow plastic tubes that are secured to the upper surface 23 of the headliner body 22 adjacent to the side duct portions 52 and 54. As shown in FIG. 3, the blow molding allows forming a narrow portion of the devices 70 that passes the wider portion of the side ducts 52 and 54 that are aligned with the forward air vents 24 and 25. An additional energy management device 72 is shown in FIG. 3 as being installed across the front edge of the headliner body 22. The energy management devices 70 and 72 are meant to function as crush zones if impacted by a driver or passenger during a collision. By collapsing, the devices 70 and 72 absorb energy to lesson impact injury in a similar manner as an airbag device.

Figure 4A:
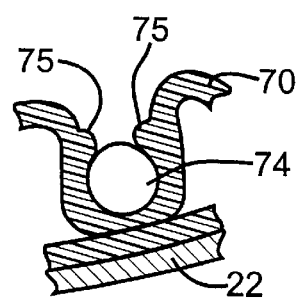
FIG. 4A is an enlarged sectional view of a portion of FIG. 4.

The energy management devices 72 also can be multifunctional. As illustrated in FIG. 4A, the devices can include attachment points for a wire harnesses 74. The attachment points can be as simple as a pair of opposed extending nubs 75 formed in the surface of the device 70. The resiliency of the plastic allows the nubs 75 to spread apart as the wiring harness 74 is inserted between them. The resiliency of the plastic then returns the nubs 75 to their original positions to retain the wiring harness 74 in position. As illustrated in FIG. 4, an additional tab 76 is formed in the air duct side portion 52 to provide positioning for the adjacent energy management device 70. Alternately, a spacing tab (not shown) can be formed extending from the energy management device 70.

While the wire attachment points have been illustrated and described as being formed upon the energy management devices 70 and 72, it will be appreciated that the wire attachment points also may be formed upon the duct portions (not shown). Additionally, while the air duct portions and the energy management devices have been illustrated and described as separate pieces, it also is contemplated that the air duct portions and the energy management devices may be blow molded as one piece (not shown).

The integration of duct pieces, energy absorbing pieces, grab handle retainers and wire harness attachments into a blow molded headliner assembly components provides benefits of lower piece pricing and tool costs.

Figure 6:
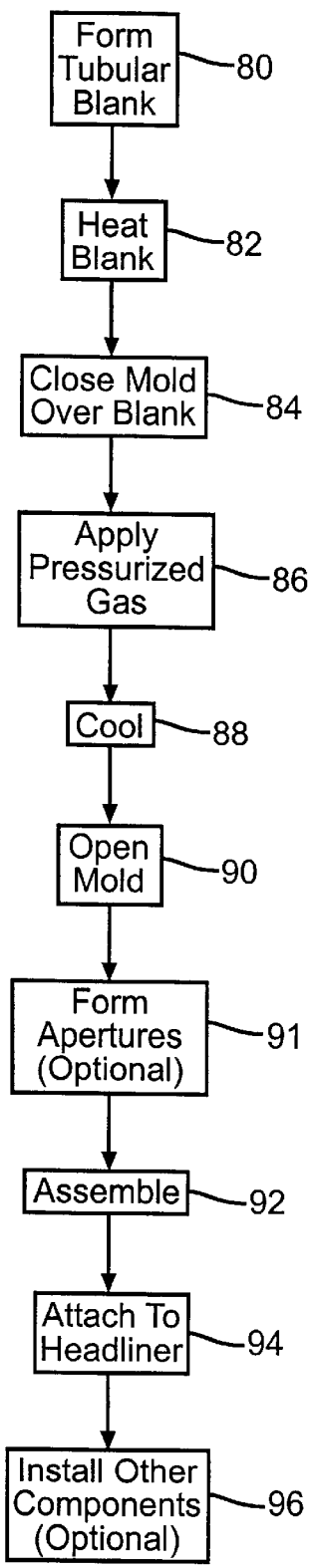
FIG. 6 is a flow chart for a process for fabricating the headliner assembly shown in FIG. 3.

The present invention also contemplates a process for forming the air duct portions, as shown in the flow chart in FIG. 6. In functional block 80, a hollow plastic blank is formed. In the preferred embodiment, available stock, such as tubular stock, can be utilized to form the blank. When stock is cut to form the blanks, one end would be heated and sealed. The other end is left open to receive the pressurized gas during the molding operation. Other hollow stock having a square or rectangular cross section also can be used as well as stock having a polygonal or other cross sectional shapes.

The blank is heated to become ductile in functional block 82. A multi-piece mold is then closed over the blank in functional block 84 and pressurized gas is injected into the open end of the heated blank in functional block 86 to force the plastic outward and into conformance with the shape of the mold cavity.

After the blank and mold are cooled in functional block 88, the mold is opened in functional block 90 and the component is removed. Any needed apertures are formed through the component in functional block 91; however, this step is optional since apertures may not be required. The individual components are assembled in functional block 92 by a conventional process, such as, for example, sonic, vibration or dielectric welding or with adhesive bonding. Finally, in functional block 94, the blow molded component is attached to the non-exposed upper face of a headliner body. Again, a conventional process would be used for the attachment, such as, for example, sonic, vibration or dielectric welding or with adhesive bonding. In functional block 96, auxiliary components, such as grab handles or wiring harnesses are secured to attachment points formed in the blow molded components to complete the headliner assembly; however, this step is optional.

It will be appreciated that the above forming process can be utilized for air duct components, energy management devices and other hollow components used for a vehicle to include an integral air duct and energy management device.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A headliner assembly comprising:

a formed headliner body having at least one aperture formed therethrough;

at least one seamless blow molded generally tubular air duct attached to said headliner body, said air duct forming an enclosed conduit for supplying air to a vehicle passenger compartment, said air duct having at least one aperture formed therethrough, said air duct aperture aligned with said aperture formed through said headliner body; and at least one energy management device attached to said headliner body, said energy management device having a shape that is complementary to said air duct, such that said energy management system can be located upon said headliner body adjacent to said air duct, said energy management device formed from plastic by a blow molding process and including at least one generally hollow portion.

2. The headliner assembly according to claim 1 wherein said air duct is formed from at least two generally tubular seamless blow molded portions that are joined together by a weld that forms an air-tight seal.

3. The headliner assembly according to claim 2 wherein said air-tight seal is formed by sonic welding.

4. The headliner assembly according to claim 1 wherein said air duct also includes at least one tab extending threrefrom, said tab having at least one aperture formed therethrough, said aperture co-operating with said tab to provide an attachment point for a grab assist handle.

5. The headliner assembly according to claim 1 wherein said air duct also includes at least one device that is adapted for attaching a wiring harness externally to the headliner assembly.

6. The headliner assembly according to claim 1 further including at least one vane integrally formed within said air duct for guiding a flow of air through said air duct.

7. The headliner assembly according to claim 1 wherein said tubular hollow portion of said passive energy management device is seamless.

8. The headliner assembly according to claim 7 wherein said passive energy management device is integrally formed with said air duct.

9. The headliner assembly according to claim 1 wherein said air duct is attached to said headliner body by sonic welding.

10. The headliner assembly according to claim 1 wherein said passive energy management device is attached to said headliner body by sonic welding.

11. A headliner assembly comprising:

a formed headliner body having at least one aperture formed therethrough;

a seamless blow molded tubular air duct attached to said headliner body, said air duct forming an enclosed conduit for air and having at least one aperture formed therethrough, said air duct aperture aligned with said aperture formed through said headliner body; and at least one energy management-device formed from plastic by a blow molding process integrally formed with and adjacent to said air duct, said energy management device having a shape that is complementary to said air duct and including at least one device having at least one pair of opposing nubs formed thereon for attaching a wiring harness to the headliner assembly.

12. A headliner assembly comprising:

a formed headliner body having at least one aperture formed therethrough;

a seamless blow molded tubular air duct attached to said headliner body, said air duct forming an enclosed conduit for air and having at least one aperture formed therethrough, said air duct aperture aligned with said aperture formed through said headliner body; and at least one mounting device formed upon an external surface of said air duct.

\* \* \* \* \*